United States Patent
Hall

(10) Patent No.: US 7,809,939 B2
(45) Date of Patent: Oct. 5, 2010

(54) TRUSTED POINT-TO-POINT COMMUNICATION OVER OPEN BUS

(75) Inventor: Clifford D. Hall, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 1214 days.

(21) Appl. No.: 11/395,010

(22) Filed: Mar. 31, 2006

(65) Prior Publication Data

US 2007/0234035 A1  Oct. 4, 2007

(51) Int. Cl.
*H04L 29/02* (2006.01)
*H04L 9/08* (2006.01)

(52) U.S. Cl. .................. 713/154; 713/162; 380/278
(58) Field of Classification Search .......... 713/152, 713/189, 192–194, 154, 162; 380/278
See application file for complete search history.

(56) References Cited

U.S. PATENT DOCUMENTS

| 4,654,655 | A | * | 3/1987 | Kowalski | 710/114 |
| 5,245,617 | A | * | 9/1993 | DeSouza et al. | 714/766 |
| 6,098,133 | A | * | 8/2000 | Summers et al. | 710/107 |
| 6,141,757 | A | * | 10/2000 | Seeker et al. | 726/22 |
| 6,192,477 | B1 | * | 2/2001 | Corthell | 726/11 |
| 6,725,371 | B1 | * | 4/2004 | Verhoorn et al. | 713/161 |
| 7,286,667 | B1 | * | 10/2007 | Ryal | 380/200 |
| 7,382,882 | B1 | * | 6/2008 | Immonen | 380/270 |
| 2005/0108532 | A1 | * | 5/2005 | Bajikar | 713/171 |
| 2005/0154901 | A1 | * | 7/2005 | Shaw et al. | 713/189 |
| 2005/0223377 | A1 | * | 10/2005 | Galal et al. | 718/1 |
| 2006/0215839 | A1 | * | 9/2006 | Augenstein et al. | 380/277 |

OTHER PUBLICATIONS

Bhatt, Creating a PCI Express™ Interconnect, 2002, Technology and Research Labs, Intel Corporation, White paper, pp. 1-8.*
Microsoft Corporation, Microsoft® Computer Dictionary, Fifth Edition, May 1, 2002, pp. 96 and 588.*
Wavecrest, *Understanding the PCI Express 1.1 Specification Quick Guide*, Eden Prairie, MN., www.wavecrest.com, 8 pages.

* cited by examiner

*Primary Examiner*—Kambiz Zand
*Assistant Examiner*—Michael Guirguis
(74) *Attorney, Agent, or Firm*—Blakely, Sokoloff, Taylor & Zafman LLP

(57) ABSTRACT

A method and apparatus provides for trusted point-to-point communication over an open bus. An embodiment of a computer includes a first software environment, with the first software environment being a trusted environment. The first software environment includes one or more trusted applications, and provides for the generation of trusted data packets in an open bus. The computer also includes a second software environment, with the second software environment being an un-trusted environment. The computer includes a trusted interface for an open bus, the trusted interface being accessible only to the first software environment. Other embodiments are described and claimed.

28 Claims, 7 Drawing Sheets

TRUSTED POINT-TO-POINT COMMUNICATION OVER OPEN BUS

FIELD

An embodiment of the invention relates to computer systems in general, and more specifically to trusted point-to-point communication over an open bus.

BACKGROUND

In computer operations, certain transactions require security because of the nature of the data being transferred. The data may commonly be encrypted using, for example, encryption by a public key and decryption by a private key. When devices possess the necessary keys, then data can be securely exchanged over an open bus.

However, the establishment of the secure transaction requires that a key exchange between the devices be made over some communication channel. In particular, the public key for a first device is provided to a second device in the transaction such that the second device may encrypt a message to the first. The transfer of a public key may be detected if, for example, the system has been compromised by a virus or other attack software. While the improper detection of a public key does not comprise the security of a message encrypted using such public key, the key does provide a unique identifier, which could be used to improperly track activities by a system and thereby creating privacy and other security concerns. In safeguarding privacy, the primary defense is against attack software. Protection from hardware attacks is not a direct concern for privacy as privacy may be considered to be compromised if an attacker has obtained physical access to the system.

For the establishment of secure transactions, there may be concern whether the endpoint (receiving device) is the intended target for a transaction. If a key exchange can be redirected to a remote system with the same model device, it may appear that a secure channel has been set up, when in fact an attacker controls the endpoint. This is commonly known as the "man-in-the-middle attack". Such an attack is typically handled in a closed system by signing electronically the public key of the device. However, signing proves to be difficult to implement in an open system where devices from many parties need to be integrated, and new devices are constantly being developed.

The open bus of a computer system and the interface for the bus do not conventionally include a protocol mechanism to establish a private channel that could be used for secure transactions, such as an encryption key exchange. Thus, a separate private hardware channel is generally required to transfer the unique keys. However, the use of a separate hardware channel increases the complexity of a system, requiring that an appropriate hardware channel be established between any devices that may be involved in secure transactions.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
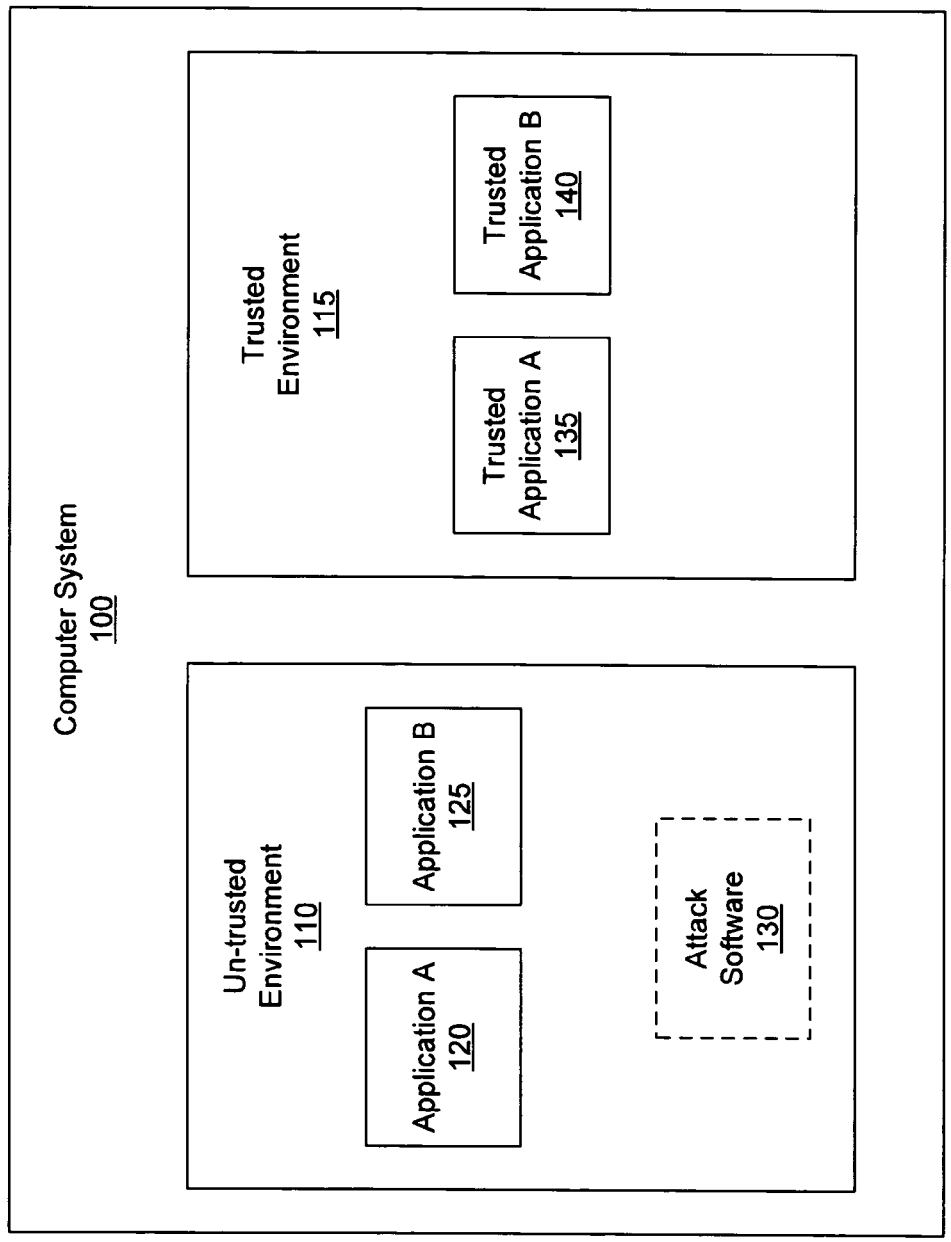
FIG. 1 illustrates an embodiment of a computer system using a trusted configuration protocol.

A method and apparatus are described for trusted point-to-point communication over an open bus.

As used here, "bus topology" means the structure of interconnections of a computer system. A "switched tree bus topology" means a bus topology in which shared switches are used to fan out signals for communication. A bus topology may including, but is not limited to, the PCI (Peripheral Component Interconnect) Express bus architecture, as described in the PCI Express 1.1 Specification (including the Base, the Card Electromechanical and the Mini Card Electromechanical specifications)(PCI-SIG Apr. 11, 2005).

As used here, "open bus" means a computer bus that is open to non-secure communications. An open bus is generally open to access by devices in a computer system.

As used herein, "bus switch" means any device that is intended to direct data traffic in a computer system. The term bus switch may include devices described as switches, hubs, and other related devices.

As used here, "key" means a number or code for the encryption or decryption of data. As used here, "public key encryption" means a cryptographic system that includes the use of two keys. In public encryption, a public key is a key to encrypt a message. A private or secret key is a key to decrypt a message and should be known only to the recipient of the message.

As used here, "trusted environment" means a software environment in which the source and destination of communications are trusted. As used herein "un-trusted environment" means any software environment that is not a trusted environment, and includes environments that may be referred to as partially trusted environments or incompletely trusted environments.

In an embodiment of the invention, a computer system provides secure communications in a system using an open bus. In an embodiment of the invention, assurance is provided in a computer system that a transaction endpoint for a trusted communication is local to the system. In an embodiment of the invention, a computer system provides a trustable point-to-point link with trusted data packets. The trusted data packets are transferred using the same open bus as other un-trusted communications. In an embodiment of the invention, a private channel is embedded within an open bus protocol.

In an embodiment of the invention, a system may utilize an open bus for the performance of a key exchange via trusted packets. In such embodiment, a system sends a trusted packet, which is directed by network switches to the correct trusted recipient. The trusted recipient responds to any received trusted data packet.

In one embodiment of the invention, a protocol extension is provided to an open bus to support secure communications for the system. In an embodiment of the invention, the open bus has a controller that supports trusted communications, and that provides an interface mechanism between a trusted environment and trusted data packets on the open bus. In a particular embodiment of the invention, a switched tree topology bus is modified to establish the trustable point-to-point link with trusted packets.

In a computer system, a system has at least two software environments in operation. Each software environment may be implemented as a virtual machine, different modes of operation, or any other mechanism for simultaneous operation. In an embodiment of the invention, the system includes:

(1) An un-trusted environment running conventional software applications. The environment may also include attack software, attack software being any virus or other software agents that are intended to produce harm of some kind.

(2) A trusted environment running trusted applications for the purpose of providing trusted point-to-point communications.

In an embodiment of the invention, the protocol for an open bus provides for the generation of trusted packets. In this embodiment, no devices can generate trusted packets, the trusted packets being only generated in the open bus. The trusted packets may then be utilized in a trusted point-to-point link between devices in the trusted environment. In an embodiment of the invention, a trusted packet can only be generated in connection with the trusted software environment. Further, the bus topology includes a trusted configuration interface or aperture that is only available for trusted communications, which may thus be used in the generation of trusted packets. In an embodiment of the invention, each packet includes a bus device source ID that is persistent and unchanged for the life of the packet. The persistence and unchangeable nature of the bus device source ID assists in the assurance of a trusted link for data transfer. In an embodiment of the invention, routing is based on bus device IDs and a mechanism is provided to ensure that each device is assigned a unique bus device ID and that each bus device ID remains unchanged until the system is reset. While such assignment of IDs may occur for conventional tree buses, in an embodiment of the invention the protocol of the bus specifically prevents un-trusted software operating in the un-trusted environment from modifying or subverting any bus device ID. Prevention of such modification of bus device ID's assists in ensuring the proper routing of trusted packets to the intended endpoint, and provides assurance that an endpoint of a transaction is local to the system. In an embodiment of the invention, the locality of the endpoint can be determined directly, and thus this knowledge regarding the locality of a device can be used instead of using another method, such as signing encryption keys, to provide needed security of transactions.

In an embodiment of the invention, trusted packet generation is limited by the protocol of the open bus. In this embodiment, a trusted packet may only be generated in the root bridge or other main bridge of an open bus. For a bus, a root bridge is the bridge that transmits network topology information to any other bridges, such as using spanning tree protocol in a switched tree bus topology. The bus contains a single root bridge. The root bridge will provide an interface between a central processing unit's (CPU) domain of memory and I/O addresses and the open bus's switched packet domain. Limiting the generation of the trusted packets to the root bridge of the open bus thereby may prevent the generation of packets elsewhere in a system in a software attack or other similar condition. In an embodiment of the invention, the generation of trust packets is further limited to only circumstances in which the root bridge is accessed via a trusted configuration interface to the open bus. The trusted configuration interface is thus utilized to limit access to trusted packets and to provide for the generation of such packets.

In one embodiment of the invention, a trusted configuration interface for an open bus includes certain private address space. In an embodiment, a portion of the private address space may be used to support trusted communications. When a CPU accesses this private address space, the result is the generation of trusted packets. In an embodiment of the invention, the range of memory locations for the private address space is only accessible from a trusted environment. In one possible example, each device has a certain amount of configuration space, such as 4 KB of space. In this case when the CPU accesses in the private address space at an address, such as 4 KB+1, from the trusted software environment then will provides for the generation of a trusted packet to the first location of the device ID of the second device.

In another embodiment, an output from a trusted component, such as a trusted platform module (TPM), may be used to gate or guard access to the memory range of the private address space for trusted communications. Guarding access to the range of memory prevents unauthorized access to trusted communication addressing, thereby assisting in ensuring security of communications. A TPM is a module that is trusted in operation, as defined according to the specifications of the Trusted Computing Group (TCG), including TCG TPM Specification Version 1.2, Revision 85, February 2005. In this embodiment, the trusted software environment is utilized to limit the memory range. The trusted environment is then required to interact with the TPM to open the access. Is this manner, the TPM can limit access to the memory range, which limits access to the trusted communications process.

In an embodiment of the invention, a mechanism is provided in each bus switch of a computer system to ensure that a trusted packet that is received will be routed to the correct recipient device. In this embodiment, each bus switch contains a trusted packet mechanism or module that will allow a trusted packet to be forwarded only to the designated recipient. In this manner, there is assurance provided that the trusted packet will be sent to the correct party. The mechanism allows both trusted and un-trusted packets to be handled by the same bus switches for an open bus. In an embodiment, certain bits of a packet may set to designate a trusted packet, with the setting of such bits being limited to only the open bus. In one embodiment of the invention, one or more bits of a configuration packet are set only for a trusted packet. For example, a reserved bit may be set to "0" for any un-trusted packet and set to "1" for a trusted packet. In an embodiment of the invention, the setting of the bit is limited by the protocol of the open bus to only circumstances in which the CPU accesses the open bus trusted configuration interface in the trusted environment. In this manner, the setting of the bit can only occur in the generation of the trusted packet in the open bus, and the set bit then can be used by bus switches to identify trusted packets, and thus ensure the proper handling of such trusted packets.

In one embodiment, a bus switch includes a lockable routing table mode. The mode allows the routing table to be locked and remain unchanged once the mode is enabled, with the table only changeable by a trusted data packet. The locking of the table thus prevents attempts to reroute data packets, thereby providing additional assurance that the endpoint of a communication is the intended recipient of the communication.

In a further embodiment of the invention, certain devices in a network are trusted devices, with each such device containing a mechanism or module for responding to trusted packets. In this embodiment, a trusted device that receives a trusted packet will provide a response and will provide the response only to the source of the data packet. In this manner, there is assurance that a trusted packet will result in the generation of a response and that the response will be directed to the source of the packet. In an embodiment of the invention, each trusted device in a system has an address assigned by the system topology, with such address being used in transfer of trusted packets. In an embodiment of the invention, a trusted device will recognize a trusted packet by one or more bits that have been set in the packet. If the appropriate bit is set, then the device recognizes the packet as trusted and will provide a response to such packet. If the bit is not set, the packet is un-trusted and is handled accordingly.

In an embodiment of the invention, trusted packets may be transferred without encryption because of the trusted transmission of such packets and because there is assurance that such packets will be directed to the intended recipient. Because an embodiment of a network switch provides assurance of delivery of a packet to the intended recipient and because a trusted device will recognize and provide a response to a trusted packet, a trusted packet will be received, a response will result, and the resulting trusted response packet will again be directed to the sender of the original packet. For this reason, the encryption of the packet is not necessary for the purposes of establishing secure communications.

In an embodiment of the invention, the combination of bus switches that direct trusted packets to intended trusted devices, and trusted devices that respond to trusted packets. An embodiment of the invention provides a physical topology for a network to ensure that a secure communication will be received and will result in a response. The physical topology of a network refers to the configuration of cables, computers, and other peripherals.

In an embodiment of the invention, secure communications are provided without requiring a separate connection for establishing security, with uses including, but not limited to, the establishment of encryption key. In a conventional structure, a system utilizes a separate communication channel, provided on other wires or communications means, in order to communicate secure information. For example, in a conventional structure encryption keys may be exchanged using a separate secure channel, with the encryption keys then be used to transfer encrypted communications on an open bus. However, the addition of a separate channel adds to complexity and cost of a system. In an embodiment of the invention, a system facilitates secure communication of data without the need for a separate secure channel, utilizing a pre-existing open bus structure. In an embodiment of the invention, assurance is provided that communication is with a particular hardware device in the computer, and is not being fooled ("spoofed") by a remote system, without the need for a separate physical connection.

In one embodiment of the invention, a network includes:

(1) An interface to an open bus that may be accessed only in a trusted environment. In this embodiment, access to the interface is limited to a trusted environment for the purpose of creating trusted packets on the bus. In this manner, a system may use the open bus for transmission of trusted packets, as well for as other applications involving transmission of non-trusted data packets.

(2) An open bus protocol that supports trusted packets. In an embodiment of the invention, no devices can generate trusted packets, the generation of trusted packets being limited to the open bus, such as in the root bridge of the bus.

(3) A mechanism or module in each bus switch or similar device for the open bus to ensure that a trusted packet is recognized by the bus switch and is routed by the bus switch only to the address for the packet. The mechanism ensures that a trusted packet will not be routed to any device other than the intended recipient. In one embodiment, one or more bits of a trusted packet are set in the generation of such packet, and a bus switch or similar device will recognize the set bits as designating the trusted packet. Further, the bus switch may include a locking routing table mode to prevent improper rerouting of packets.

(4) A trusted device that responds to trusted packets. In an embodiment of the invention, a system includes one or more devices that will respond to trusted packets, and will return a response to the sender. In one embodiment, the trusted device will recognize that one or more bits of a trusted packet are set to designate a trusted packet.

FIG. 1 illustrates an embodiment of a computer system using a trusted configuration protocol. In this illustration, a computer system 100 includes two software environments. A first software environment is an un-trusted environment 110 that includes conventional software, such as an application A 120 and an application B 125. Because this is an un-trusted environment, there may also be attack software 130 that has not been detected. A second software environment is a trusted environment 115 that includes trusted applications, including, for example, a trusted application A 135 and a trusted application B 140. Each such software environment may be implemented as a virtual machine, a mode of operation, or other mechanism for simultaneous operation.

In this illustration, the computer system 100 may utilize the separate software environments to establish a trustable point-to-point link using trusted packets. In one embodiment of the invention, a key exchange is conducted using trusted packets in the trusted software environment 115. After the keys have been established, an open bus may be used to transport data that has been encrypted using the exchanged keys in a known transfer protocol. In this manner, the data may be transferred in a secure fashion over an open bus in an un-trusted software environment using encryption keys established in a trusted software environment using the same open bus.

Figure 2:
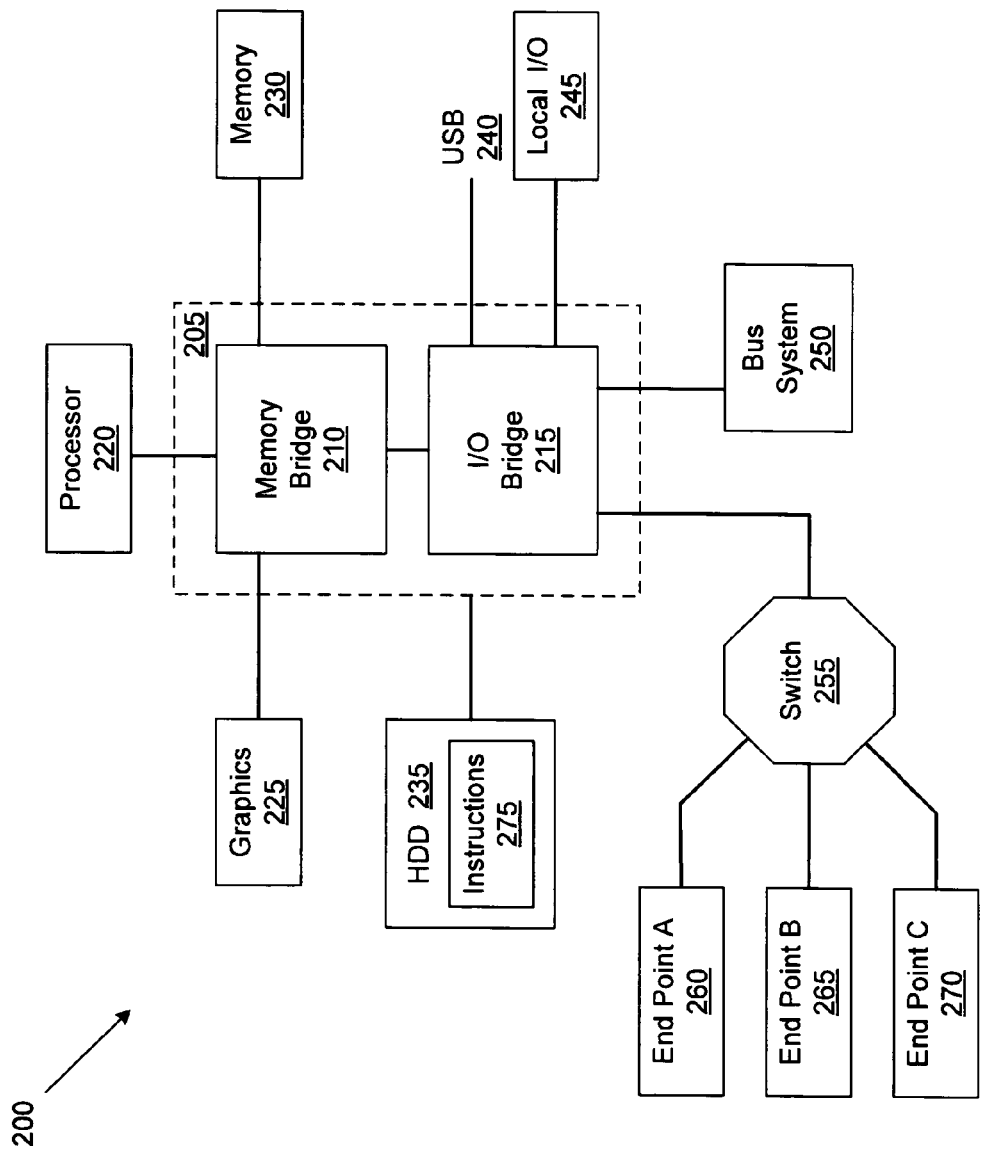
FIG. 2 illustrates an embodiment of a tree topology bus.

FIG. 2 illustrates an embodiment of a switched tree topology bus. The tree topology may be a PCI Express topology. In this example, a computer system 200 includes a memory bridge 210 and an I/O (input/output) bridge 215, which may form part of a unit or chipset 205. The memory bridge may be coupled with a processor 220 (a central processing unit or CPU), to graphics 225 for display, and to memory 230 for data storage, with the processor 220 accessing the data stored in the memory 230. The memory 230 may be random access memory (RAM), which includes dynamic random access memory (DRAM), which requires refreshing of memory contents, and static random access memory (SRAM), which does not require refreshing contents. DRAM memory may include synchronous dynamic random access memory (SDRAM), Rambus dynamic random access memory (RDRAM), and extended data-out dynamic random access memory (EDO DRAM). The memory bridge 210 is coupled with the I/O bridge 215, which is in turn coupled with a hard disk drive (HDD) 235 or similar device for persistent data storage, including the storage of instructions 275, a link such as a USB (universal serial bus) 240, local I/O 245, and a bus system 250, such as a legacy bus topology. The I/O bridge 215 is further coupled with a switch 255, which is used to fan out data to various devices, shown here as end point A 260, end point B 265, and end point C 270.

In an embodiment of the invention, the bus topology of the computer system is an open bus that may be used in secure transfers of data. In an embodiment, the bus switches include mechanisms or modules to enable the switches to recognize trusted packets and to direct such packets only to the intended recipient. Further, the bus topology includes a trusted interface that is only available for trusted communications. The computer system will include trusted components, which include mechanisms or modules to ensure that a response will be made to trusted data packets.

Figure 3:
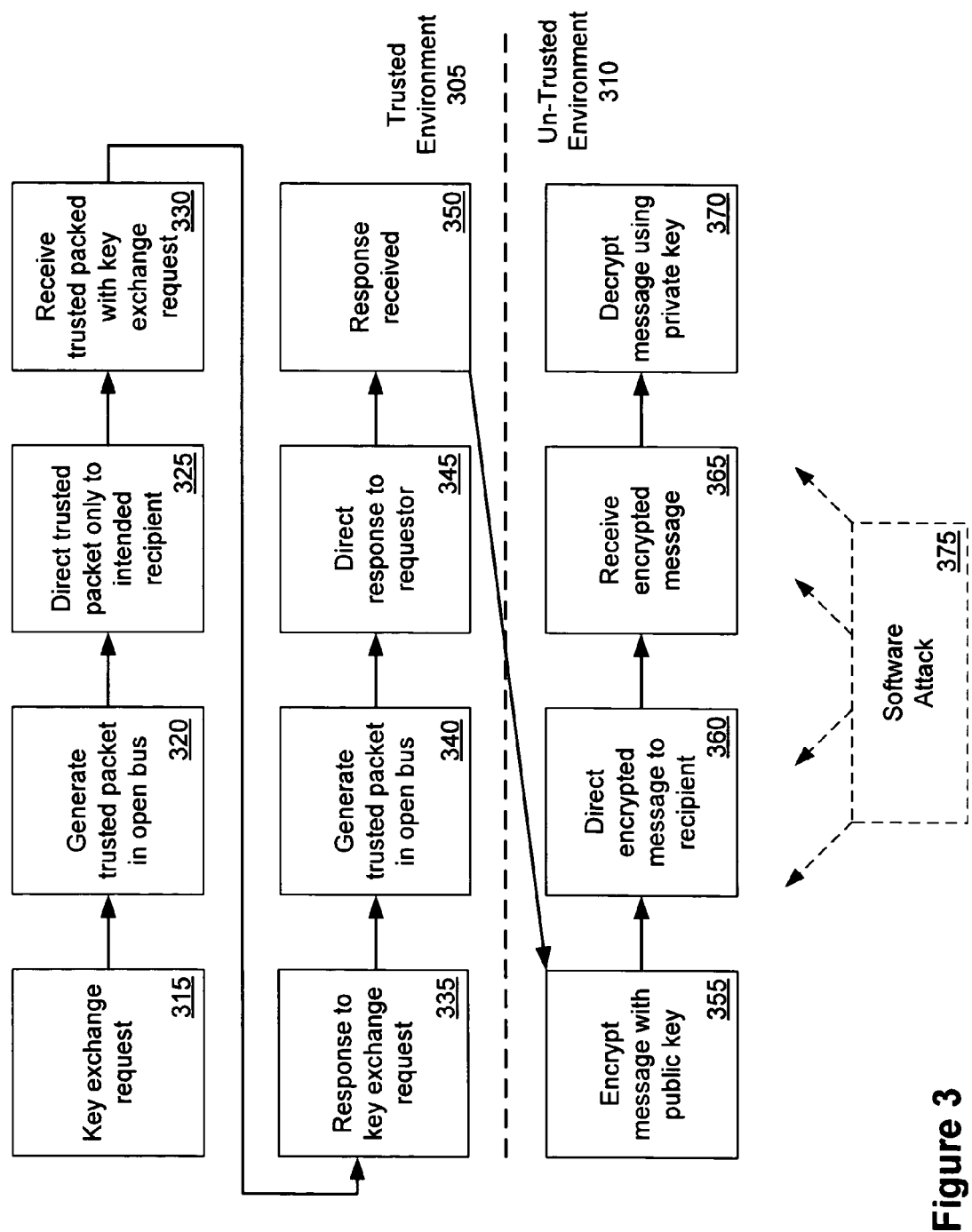
FIG. 3 is an illustration of an embodiment of a process for secure communications over an open bus.

FIG. 3 is an illustration of an embodiment of a process for secure communications over an open bus. In this illustration, a computer system having an open bus includes at least two software environments, the environments including a trusted environment 305 and an un-trusted environment 310. In an embodiment of the invention, the transfer of a secure communication is required, which may include the encryption of data packets for transfer between devices. However, establishment of the encryption may require a key exchange, which is not generally secure over an open bus.

In this illustration, a key exchange request 315 is made in the trusted environment. A trusted packet for the key request is generated in the open bus 320, the trusted packet including a public encryption key. The trusted packet is transferred, with the trusted packet being recognized and directed only to the intended recipient 325. In one embodiment, the trusted module may be recognized because one or more bits were set in the generation of the trusted module. The key request is received by the recipient 330, which contains a mechanism or module that ensures that a response to the key request will be made. A response to the key request is made 335, which provides the exchange of keys for the secure transfer of data. A trusted packet is generated 340, which may include the return of the public key for the receiving trusted device. The response is directed to the key requestor 345, with the response again being a trusted packet that is only directed to the intended recipient. The response to the key request is received 350, thereby completing the key exchange. In an embodiment of the invention, the key exchange is accomplished using the open bus.

The process then can proceed to the un-trusted environment 310, which may include conventional transfer of secure data in a system over the open bus of the computer system. In this example, a certain data packet is encrypted 355 using the public key established in the key exchange. The encrypted message is directed to the recipient 360. If there are no problems in the transmission, the encrypted data is received 365 and the message is decrypted using the private key established in the key exchange 370. The process may continue, such as in the return of a response that is encrypted with the exchanged public key. In the un-trusted environment 310 there may be a software attack directed at a portion of the data transfer 375, but the data is encrypted and decrypted using the exchanged encryption keys. The transactions for the key exchange 315-350 were performed in the trusted environment 305 and thus were not subject to the software attack 365.

Figure 4:
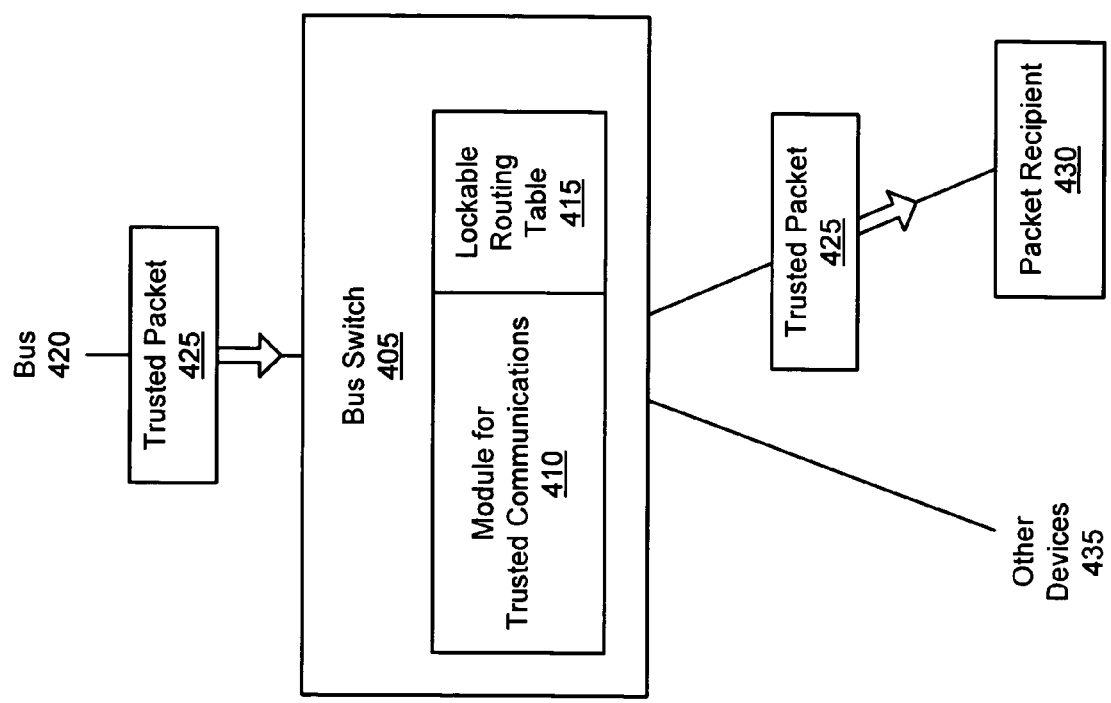
FIG. 4 is an illustration of embodiment of a bus switch for secure transactions.

FIG. 4 is an illustration of embodiment of a bus switch for secure transactions. A bus switch 405 includes a module for trusted communications 410. Bus switch 405 may include switch 255 in FIG. 2. The module 410 ensures that data will be directed to the intended recipient. For the routing of trusted data packets, the bus switch 405 includes a routing table with a lockable mode 415, the routing table 415 only being changeable by a trusted packet once the locking mode is engaged.

In an example, a trusted data packet 425 may be received from a bus 420, the bus 420 being an open bus. The bus switch 405 may be coupled to the intended packet recipient 430 (directly or via an intermediary to the packet recipient) as well as other devices 435, but the module 410 will ensure that the trusted packet 425 will only be directed to the intended device, the lockable routing table 415 ensuring that the path of the trusted data packet is not changed by a change to the routing table 415.

Figure 5:
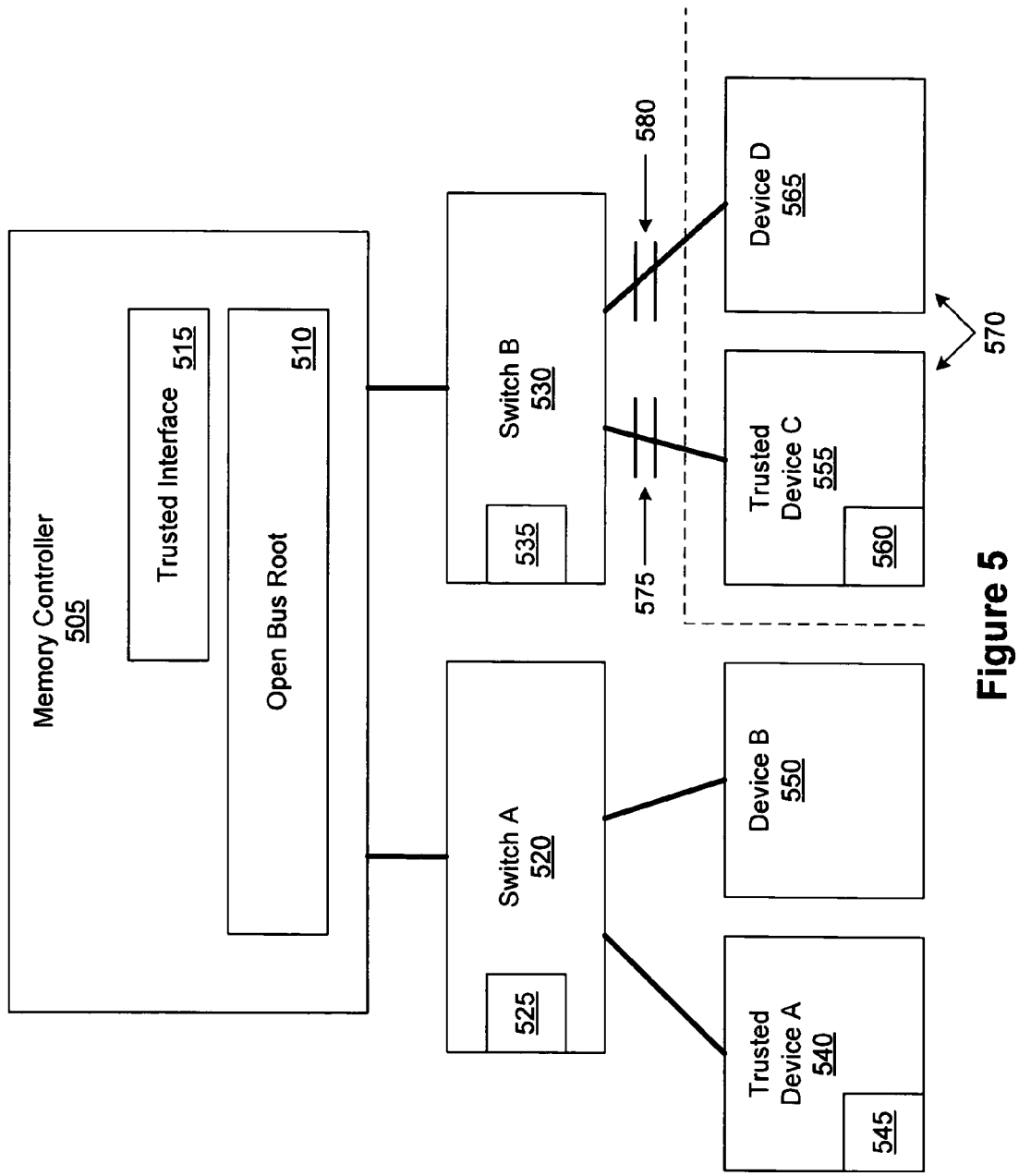
FIG. 5 illustrates an embodiment of a network topology.

FIG. 5 illustrates an embodiment of a network topology. In this illustration, a memory controller 505 for a computer system includes an open bus root, such as the PCI Express root. The memory controller may be included in an HI bridge, including I/O bridge 215 of FIG. 2. A trusted interface 515 is included to provide for the transfer of trusted communications on the open bus, the trusted interface only being accessible in a trusted software environment. The protocol of the open bus provides for the generation of trusted data packets for trusted point-to-point communications, with the generation of trusted data packets being limited to the open bus.

Multiple switches may exist to control data flow in the computer system, including switch A 520 and switch B 530. Each such bus switch includes a module for trusted communications, shown as module 525 for switch A 520 and module 535 for switch B 530. Each such switch may be connected to multiple devices, such as switch A 520 being connected to a device A 540 and device B 550. In this illustration, device A 540 is a trusted device, and each such trusted device includes a module 545 for trusted communications, which ensures that the trusted device returns a response to the sender of a trusted communication. The devices may also include plug-in devices 570, with switch B 530 being connected to a plug-in trusted device C 555 through interconnect 575 and to device D through interconnect 580. Trusted device C 555 again includes a module for trusted communications 560.

Figure 6:
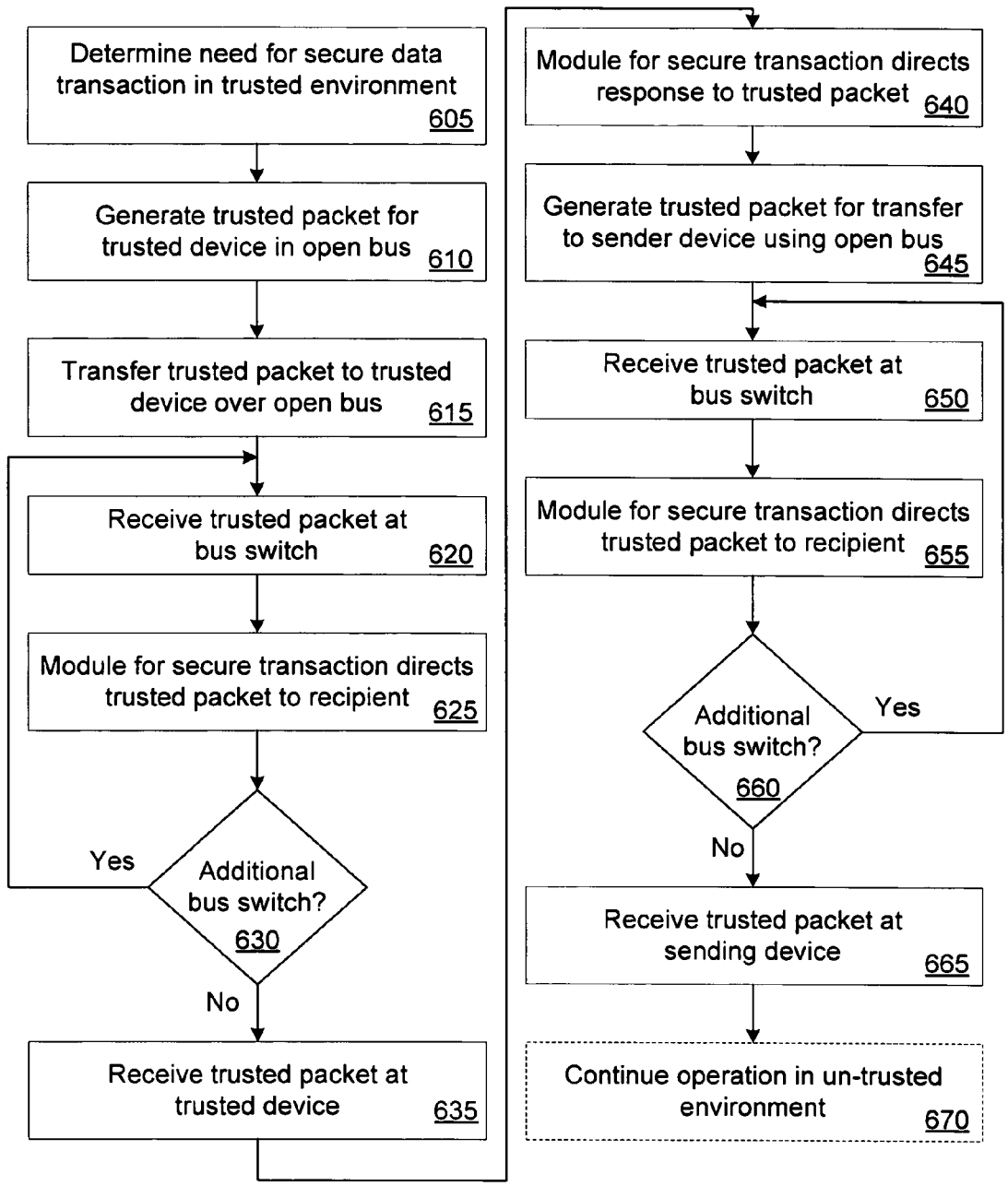
FIG. 6 is a flowchart to illustrate an embodiment of a process for secure transfer of data over an open bus.

FIG. 6 is a flowchart to illustrate an embodiment of a process for secure transfer of data over an open bus. In this illustration, a computer system determines that a secure transaction is required for a device using the trusted environment of the computer system 605. The computer system includes at least the trusted environment and an un-trusted environment. The secure transaction may include, but is not limited to, an encryption key exchange. In the trusted environment, the device requests a trusted packet for transfer to a trusted device 610. The trusted packet is generated in the open bus, with devices in the system being prohibited from generating trusted packets. The trusted packet is then transferred to the trusted device over the open bus 615.

The trusted packet is received at a bus switch 620, with a module for secure transactions directing the trusted packet only to the intended recipient 625. The trusted packet may include one or more bits that were set in the generation of the packet, the bus switch using the set bits to identify the trusted recipient. Other bus switches may be encountered 630, resulting in further actions to direct the trusted packet to the intended recipient. The trusted packet is received at the trusted device 635, with the trusted device including a module for secure transactions that directs the return of a response to the trusted packet 640. A trusted packet is generated for transfer over the open bus to the sender of the original trusted packet 645. The response is again transferred via receipt at a bus switch 650, with the module for secure transactions of the bus switch directed the trusted packet only to the intended recipient 655. If further bus switches are encountered 660, the process for transfer is repeated. The trusted packet containing the response is received by the sending device 665, and operations then may continue in the un-trusted environment of the computer system 670.

Figure 7:
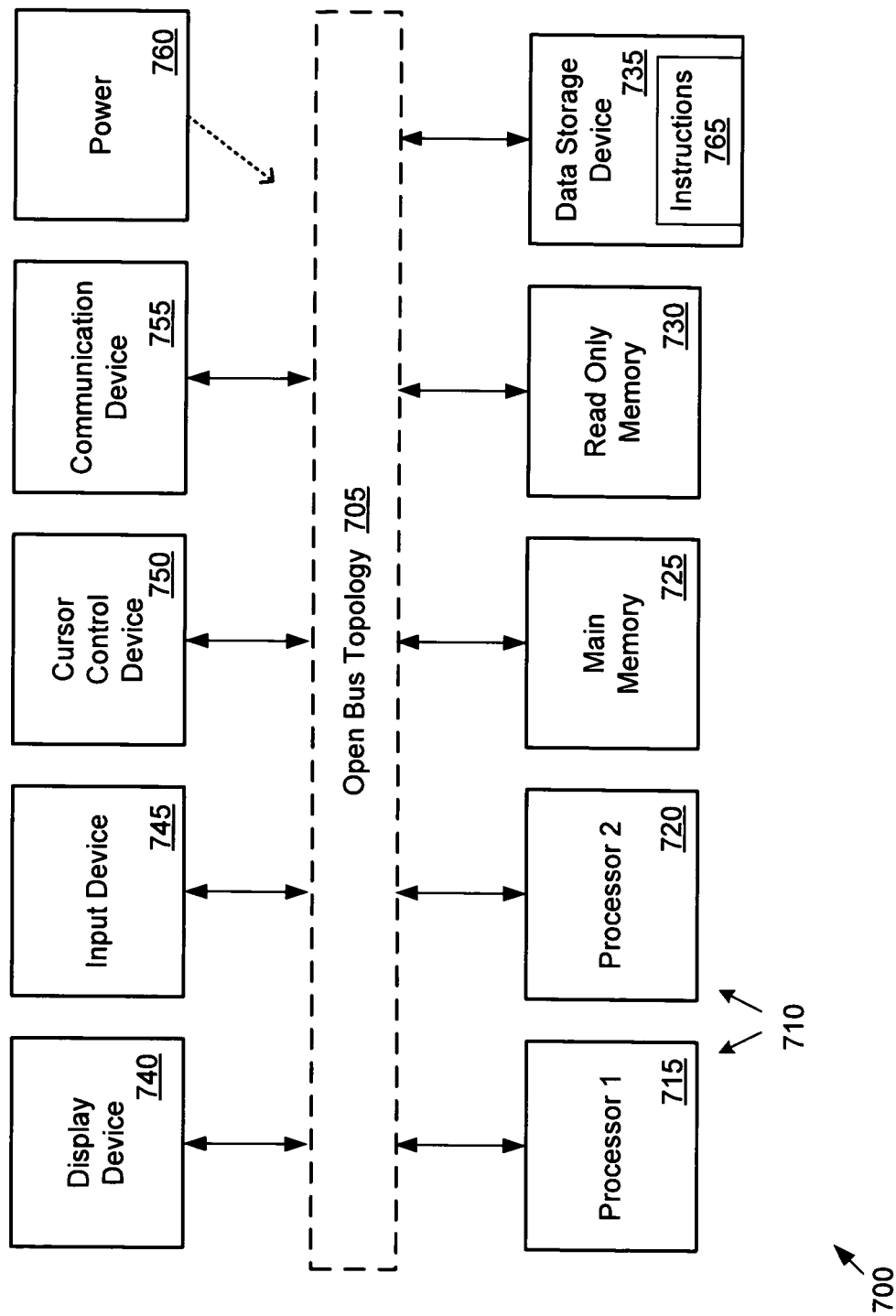
FIG. 7 is an illustration of a computer system that may be used in an embodiment of the invention.

FIG. 7 is an illustration of a computer system that may be used in an embodiment of the invention. Certain standard and well-known components that are not germane to the present invention are not shown. In an embodiment of the invention, a computer 700 comprises an open bus topology (Bus) 705 or other communication means for communicating information. In an embodiment, the bus 705 is an open bus that is accessible both for trusted and non-trusted communications. The bus 705 includes one or more bus switches to direct data between elements, with the bus switches not being illustrated in this figure. Each bus switch includes a module or mechanism for support of trusted communications. In an embodiment of the invention, one or more devices in the computer 700 are trusted devices, each trusted device including a module or mechanism for support of trusted communications The computer further comprises a processing means such as two or more processors 710 (shown as a first processor 715 and a second processor 720) coupled with the bus 705 for processing information. The processors 710 may comprise one or more physical processors and one or more logical processors. Further, each of the processors 710 may include multiple processor cores.

The computer 700 further comprises a random access memory (RAM) or other dynamic storage device as a main memory 725 for storing information and instructions to be executed by the processors 710. Main memory 725 also may be used for storing temporary variables or other intermediate information during execution of instructions by the processors 710. The main memory may include dynamic random access memory (DRAM) and static random access memory (SRAM). DRAM memory may include synchronous dynamic random access memory (SDRAM), Rambus dynamic random access memory (RDRAM), and extended data-out dynamic random access memory (EDO DRAM). The computer 700 also may comprise a read only memory (ROM) 730 and/or other static storage device for storing static information and instructions for the processors 710.

A data storage device 735 may also be coupled to the bus 705 of the computer 700 for storing information and instructions 765, which may include instructions for trusted communications. The data storage device 735 may include a magnetic disk or optical disc and its corresponding drive, flash memory or other nonvolatile memory, or other memory device. Such elements may be combined together or may be separate components, and utilize parts of other elements of the computer 700.

The computer 700 may also be coupled via the bus 705 to a display device 740, such as a cathode ray tube (CRT) display, a liquid crystal display (LCD), a plasma display, or any other display technology, for displaying information to an end user. In some environments, the display device may be a touch-screen that is also utilized as at least a part of an input device. In some environments, display device 740 may be or may include an audio device, such as a speaker for providing audio information. An input device 745 may be coupled to the bus 705 for communicating information and/or command selections to the processors 710. In various implementations, input device 745 may be a keyboard, a keypad, a touch-screen and stylus, a voice-activated system, or other input device, or combinations of such devices. Another type of user input device that may be included is a cursor control device 750, such as a mouse, a trackball, or cursor direction keys for communicating direction information and command selections to the one or more processors 710 and for controlling cursor movement on the display device 740.

A communication device 755 may also be coupled to the bus 705. Depending upon the particular implementation, the communication device 755 may include a transceiver, a wireless modem, a network interface card, LAN (Local Area Network) on motherboard, or other interface device. In one embodiment, the communication device 755 may include a firewall to protect the computer 700 from improper access.

The computer 700 may be linked to a network or to other devices using the communication device 755, which may include links to the Internet, a local area network, or another environment. The computer 700 may also comprise a power device or system 760, which may comprise a power supply, a battery, a solar cell, a fuel cell, or other system or device for providing or generating power. The power provided by the power device or system 760 may be distributed as required to elements of the computer 700.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media / machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A computer comprising:
a first software environment, the first software environment being a trusted environment, the first software environment including one or more trusted applications, the first software environment providing for a generation of a first trusted data packet, the generation of trusted data packets being restricted to an open bus, the first trusted data packet having a bus device identification (ID) that identifies a device the first trusted data packet is transferred to or from;
a second software environment, the second software environment being an un-trusted environment;
a trusted interface for the open bus, the trusted interface providing a private address space for the open bus, the open bus generating the trusted data packets as a result of an access of the private address space, the trusted interface being accessible only to the first software environment; and
a bus switch to route the first trusted data packet from a first device to a second device based on the bus device ID of the first device and the second device, the bus switch routing the first trusted data packet using a lockable routing table including the bus device identifications of the first device and the second device.

2. The computer of claim 1, wherein the first software environment and the second software environment both use the open bus for data communication.

3. The computer of claim 1, wherein the bus device ID of the first device and the second device are persistent and unchangeable for a duration of an existence of the first trusted data packet.

4. The computer of claim 1, wherein the first trusted data packet has one or more bits set to designate a packet as a trusted data packet.

5. The computer of claim 1, wherein the first software environment supports an encryption key exchange between the first device and the second device.

6. The computer of claim 5, wherein the first device requests the encryption key exchange via the first trusted data packet and wherein the second device responds to the first trusted data packet.

7. The computer of claim 6, wherein the first device and the second device exchange an encrypted message in the second software environment using an encryption key exchanged in the first software environment.

8. The computer of claim 5, wherein the second device includes a mechanism that requires the second device to respond to the first trusted data packet.

9. A method comprising:
generating a first trusted data packet in a first trusted software environment of a computer using an open bus, the computer further including a second software environment that is an un-trusted environment, the open bus having a trusted interface that provides a private address space for the open bus, the open bus generating trusted data packets as a result of an access of the private address space, the trusted interface being accessible only to the first software environment, the first trusted data packet having a bus device identification (ID) that identifies a device the first trusted data packet is transferred to or from, the open bus communicating with the first trusted software environment via the trusted interface, the first trusted data packet being generated as a result of accessing the private address space of the open bus via the trusted interface;
transferring the first trusted data packet from a first device to a second device using a bus switch, the bus switch having a lockable routing table including bus device identifications of the first device and the second device; and
directing the first trusted data packet to an intended recipient based on the bus device ID and ensuring that the intended recipient is local to a computer system.

10. The method of claim 9, wherein generating the first trusted data packet includes establishing a source identification based on the bus device ID in the first trusted data packet, the source identification being unchanged during the existence of the first trusted data packet.

11. The method of claim 9, wherein generating the first trusted data packet includes setting a bit of a data packet to designate the data packet as trusted.

12. The method of claim 9, wherein the first trusted data packet is generated in a root bridge of the open bus.

13. The method of claim 9, further comprising returning a response to the first trusted data packet, returning the response including generating a second trusted data packet.

14. The method of claim 9, wherein directing the first trusted data packet to the intended recipient includes locking the lockable routing table, the lockable routing table being changeable only by the first trusted data packet after locking.

15. The method of claim 9, wherein the first trusted data packet includes an encryption key.

16. The method of claim 15, further comprising transferring a message in the second un-trusted software environment, the message being encrypted using the encryption key.

17. The method of claim 9, wherein the first trusted data packet may be generated only in the first trusted software environment.

18. The method of claim 9, wherein generating the first trusted data packet having the bus device ID comprises assigning a unique bus device ID to each of a plurality of devices connected to the computer system.

19. A computer system comprising:
a chipset comprising a memory bridge coupled with an I/O (input-output) bridge;
a processor coupled with the memory bridge;
a synchronous dynamic random access memory (SDRAM) memory for storage of data, the memory being coupled with the memory bridge, the processor to access data in the memory;
a first software environment, the first software environment being a trusted environment, the first software environment including one or more trusted applications;
a second software environment, the second software environment being an un-trusted environment;
an open bus coupled with the I/O bridge, the open bus supporting generation of a first trusted data packet, the first trusted data packet having a bus device identification (ID) that identifies a device the first trusted data packet is transferred to or from;
a trusted interface for the open bus, the trusted interface being accessible only to the first trusted software environment, the trusted interface providing a private address space for the open bus, the first trusted data packet being generated when the private address space of the open bus is accessed, the open bus including a bus switch, the bus switch including a module for trusted communications, the module to direct the first trusted data packet to an intended recipient based on the bus device ID of the intended recipient and to ensure that the intended recipient is local to the computer system; and a trusted device coupled with the bus switch, the trusted device having the bus device ID, the trusted device including a module for trusted communications, the module to direct the trusted device to generate a response to the first trusted data packet.

20. The computer system of claim 19, wherein the open bus includes a protocol to support the first trusted data packet.

21. The computer system of claim 19, wherein only the open bus is authorized to produce the first trusted data packet.

22. The computer system of claim 19, wherein the open bus has a switched tree bus topology.

23. The computer system of claim 22, wherein the bus topology is a PCI (Peripheral Component Interconnect) Express bus topology.

24. The computer system of claim 19, wherein the bus switch fans out to a plurality of devices, the intended recipient being one of the plurality of devices.

25. The computer system of claim 24, wherein the bus switch includes a locking mode for a routing table of the bus switch.

26. A machine-readable medium having stored thereon data representing sequences of instructions that, when executed by a machine, cause the machine to perform operations comprising:

generating a first trusted data packet with an open bus for a communication from a first device to a second device, the first trusted data packet being generated in a first trusted software environment of a computer, the computer further including a second software environment that is an un-trusted environment, the open bus having a trusted interface for the first trusted software environment that provides a private address space for the open bus, the first trusted data packet generated as a result of accessing a private address space of the open bus via the trusted interface, the first trusted data packet having a bus device identification (ID) that identifies the first device and the second device, the open bus communicating with the first software environment via the trusted interface, the trusted interface being accessible only to the first software environment;

transferring the first trusted data packet using a bus switch, the bus switch having a lockable routing table containing bus device identifications of the first device and the second device;

directing the first trusted data packet to the second device, based on the bus device ID of the second device; and generating a second trusted data packet for a response from the second device to the first trusted data packet.

27. The medium of claim 26, wherein generating the first trusted data packet includes establishing a source identification for the first trusted data packet based on the bus device ID, the source identification being unchanged during the existence of the data packet.

28. The medium of claim 26, further comprising instructions that, when executed by the machine, cause the machine to perform operations comprising:

performing a data transfer in the second un-trusted software environment based on the transfer of the first trusted data packet in the first trusted software environment.

\* \* \* \* \*